US010067260B2

(12) United States Patent
McKenney et al.

(10) Patent No.: US 10,067,260 B2
(45) Date of Patent: Sep. 4, 2018

(54) DATA PROCESSING STRUCTURE TO ENABLE TOMOGRAPHIC IMAGING WITH DETECTOR ARRAYS USING AMBIENT PARTICLE FLUX

(71) Applicant: Decision Sciences International Corporation, Poway, CA (US)

(72) Inventors: Shawn McKenney, Ramona, CA (US); Jeffrey Glover, Poway, CA (US); Michael James Sossong, Ramona, CA (US); James J. Hayes, Fort Irwin, CA (US)

(73) Assignee: Decision Sciences International Corporation, Poway, CA (US)

( * ) Notice: Subject to any disclaimer, the term of this patent is extended or adjusted under 35 U.S.C. 154(b) by 0 days.

(21) Appl. No.: 15/019,856

(22) Filed: Feb. 9, 2016

(65) Prior Publication Data
US 2016/0231456 A1  Aug. 11, 2016

Related U.S. Application Data

(60) Provisional application No. 62/114,052, filed on Feb. 9, 2015, provisional application No. 62/114,056, filed on Feb. 9, 2015.

(51) Int. Cl.
*G01V 5/00* (2006.01)
*G06T 7/00* (2017.01)
*G06T 11/00* (2006.01)

(52) U.S. Cl.
CPC .......... *G01V 5/0075* (2013.01); *G06T 7/0002* (2013.01); *G06T 11/008* (2013.01);
(Continued)

(58) Field of Classification Search
CPC ................ G01V 5/0075; G06T 11/008; G06T 2207/10072; G06T 2207/20221; G06T 2207/30232; G06T 7/0002
See application file for complete search history.

(56) References Cited

U.S. PATENT DOCUMENTS 8,554,902 B2* 10/2013 Ebert ..................... G16H 40/40
709/224
2006/0031719 A1  2/2006 Bower, III et al.
(Continued)

FOREIGN PATENT DOCUMENTS

WO  2008/070349 A2  6/2008
WO  2010/025300 A2  3/2010
WO  2016/130570 A1  8/2016

OTHER PUBLICATIONS

Eddy, Wesley M., and Mark Allman. "Advantages of Parallel Processing and the Effects of Communications Time." (2000).*
(Continued)

*Primary Examiner* — Wyatt Stoffa
(74) *Attorney, Agent, or Firm* — Perkins Coie LLP (57) ABSTRACT

Techniques, systems and apparatus are described for operating a multimode passive detection system (MMPDS). System control settings including operating parameters for the multimode passive detection system are stored. Detector signals are processed to reconstruct an image of a scanned volume and identify an object in the scanned volume based on the reconstructed image. The operating parameters and the detector signals at different processing stages are recorded. An operational health of the multimode passive detection system is monitored. Monitoring the operational health includes receiving information representing the operational health of various components of the multimode passive detection system, and determining an operational health status of one or more of the various components of the
(Continued)

multimode passive detection system based on the received information representing the operational health of the multimode passive detection system.

19 Claims, 8 Drawing Sheets

(52) U.S. Cl.
 CPC ........... *G06T 2207/10072* (2013.01); *G06T 2207/20221* (2013.01); *G06T 2207/30232* (2013.01)

(56) References Cited

U.S. PATENT DOCUMENTS

| | | | |
|---|---|---|---|
| 2006/0064491 A1* | 3/2006 | Ebert .................. | G16H 40/40 709/226 |
| 2006/0104536 A1 | 5/2006 | Hsieh et al. | |
| 2008/0121689 A1 | 5/2008 | Good et al. | |
| 2008/0191133 A1 | 8/2008 | Morris et al. | |
| 2008/0315091 A1* | 12/2008 | Morris .................. | G01T 1/18 250/307 |
| 2010/0168947 A1 | 7/2010 | Winso et al. | |
| 2011/0049355 A1 | 3/2011 | Fuhrer et al. | |
| 2011/0257534 A1 | 10/2011 | Sano et al. | |
| 2012/0104259 A1 | 5/2012 | Mann | |
| 2012/0132820 A1 | 5/2012 | Iwakiri et al. | |
| 2013/0300835 A1* | 11/2013 | Kinoshita .............. | G09G 1/002 348/46 |
| 2014/0270034 A1 | 9/2014 | Clayton et al. | |
| 2015/0304648 A1* | 10/2015 | Gulati .................. | H04N 17/002 348/175 |
| 2015/0325013 A1* | 11/2015 | Patnaik ................ | G06T 7/11 345/424 |
| 2016/0231455 A1 | 8/2016 | Hayes et al. | |

OTHER PUBLICATIONS

International Search Report and Written Opinion dated May 26, 2016 for International Application No. PCT/US2016/017202, filed on Feb. 9, 2016 (6 pages).

International Search Report and Written Opinion dated May 6, 2016 for International Application No. PCT/US2016/017185, filed on Feb. 9, 2016 (8 pages).

Nguyen, H.Q., et al., "Clock synchronisation in multi-transceiver HF radar system," 2011 IEEE International Conference on Signal Processing, Communications and Computing (ICSPCC), pp. 1-6, Sep. 2011.

Nguyen, H.Q., et al., "Noise immunity enhancement for a distributed clock system in digital HF radar," Proceedings of the 6th International Conference on Broadband Communications and Biomedical Applications (IB2COM), pp. 227-231, Nov. 2011.

* cited by examiner

DATA PROCESSING STRUCTURE TO ENABLE TOMOGRAPHIC IMAGING WITH DETECTOR ARRAYS USING AMBIENT PARTICLE FLUX

CROSS REFERENCE TO RELATED APPLICATIONS

This patent document claims the benefit of priority of U.S. Provisional Patent Application No. 62/114,052, filed on Feb. 9, 2015, and U.S. Provisional Patent Application No. 62/114,056, filed on Feb. 9, 2015. The entire contents of the before-mentioned patent applications are incorporated by reference as part of the disclosure of this document.

TECHNICAL FIELD

This application relates to devices, techniques and systems for tomographic imaging and detection using ambient cosmic ray charged particles such as muons and electrons as a passive illuminating radiation source.

BACKGROUND

Tomographic imaging systems have been developed to rely on actively produced, well-characterized beams of radiation that scan a volume of interest (VOI) in a controlled fashion. The data processing architecture for a tomographic imaging system relying on the actively produced beams of radiation is relatively simple because the data processing architecture can be keyed to the beam shape and position at any time.

SUMMARY

Techniques, systems, storage media embodying computer program products and devices are described for implementing generic data flow and processing paths in a Multimode Passive Detection System to identify individual cosmic ray charged particle tracks.

In one aspect, a multimode passive detection system includes a system control settings storage pipeline to store system control settings including operating parameters for the multimode passive detection system. A data processing pipeline is communicatively coupled to the data storage pipeline, and the data processing pipeline includes processing stages to process detector signals received from charged particle detectors to reconstruct an image of a scanned volume and identify contiguous material regions of interest (ROI) in the scanned volume based on the reconstructed image. A data recording pipeline is communicatively coupled to the system control settings storage pipeline and the data processing pipeline, and the data recording pipeline can record the operating parameters and the detector signals at different processing stages of the data processing pipeline. A system health monitoring pipeline is communicatively coupled to the data processing pipeline to receive from the data processing pipeline information representing operational health of various components of the multimode passive detection system and process the received information representing operational health of various components of the multimode passive detection system to determine a operational health status of one or more of the various components of the multimode passive detection system.

The multimode passive detection system can be implemented in various ways to potentially include one or more of the following features. The data processing pipeline, the data recording pipeline and the system health monitoring pipeline can be in operation substantially in parallel. The data processing pipeline can determine whether the identified region contains a material of interest. The processing stages of the data processing pipeline can include a data merger processing module to perform the following: obtain from the charged particle detectors detector data representing an electrical response to one or more charged particles entering respective charged particle detector as spatially separated data streams; and merge the spatially segregated data streams obtained from the detectors into a time-synchronous detection stream. The processing stages of the data processing pipeline can include an epoch merger processing module communicatively coupled to the data merger processing module, and the epoch merger processing module can parse the time-synchronous detection stream into epochs of a predetermined time duration. The data merger processing module and the epoch merger processing module in combination can collate the charged particle detector data from all of the charged particle detectors substantially simultaneously. The processing stages of the data processing pipeline can include an event finder processing module communicatively coupled to the data merger processing module and the epoch merger processing module, and the event finder processing module can identify particle tracks associated with the charged particles entering the charged particle detectors. The processing state of the data processing pipeline can include an event finder collector processing module communicatively coupled to the event finder processing module, and the event finder collector processing module can collect the identified particle tracks. The processing stages of the data processing pipeline can include an ROI finder processing module communicatively coupled to the event finder collector processing module, and the ROI finder processing module can identify the region in the scanned volume based on the collected particle tracks. The processing stages of the data processing pipeline can include a material of interest detection processing module communicatively coupled to the ROI finder processing module, and the thread detection processing module can determine whether the identified ROI contains a material of interest. The received information representing operational health of various components of the multimode passive detection system can include comparing the received information representing operational health of various components of the multimode passive detection system against predetermined parameters to determine the operational health status of one or more of the various components of the multimode passive detection system. The operating parameters can include a number of sensor modules in the multimode passive detection system.

In another aspect, a method of operating a multimode passive detection system includes storing system control settings including operating parameters for the multimode passive detection system. The method includes processing detector signals to reconstruct an image of a scanned volume and identify contiguous material regions in the scanned volume based on the reconstructed image. The method includes recording the operating parameters and the detector signals at different processing stages. The method includes monitoring an operational health of the multimode passive detection system including receiving information representing the operational health of various components of the multimode passive detection system, and determining an operational health status of one or more of the various components of the multimode passive detection system based on the received information representing the operational health of the multimode passive detection system.

The method can be implemented in various ways to potentially include one or more of the following features. The data processing, the data recording and the operational health monitoring can be performed substantially in parallel. The data processing can include determining whether the identified region contains a material of interest. The data processing can include merging detector data from the charged particle detectors. The merging detector data from the charged particle detectors can include obtaining from the charged particle detectors detector data representing an electrical response to one or more charged particles entering respective charged particle detector as spatially separated data streams; and merging the spatially segregated data streams obtained from the detectors into a time-synchronous detection stream. The data processing can include parsing the time-synchronous detection stream into epochs of a predetermined time duration. The data processing can include collating the charged particle detector data from all of the charged particle detectors substantially simultaneously. The data processing can include identifying particle tracks associated with the charged particles entering the charged particle detectors based on the epochs; and collecting the identified particle tracks. The data processing can include identifying ROIs in the scanned volume based on the collected particle tracks; and determining whether the identified region contains a material of interest. The monitoring the operational health includes comparing the received information representing operational health of various components of the multimode passive detection system against predetermined parameters to determine the operational health status of one or more of the various components of the multimode passive detection system. The operating parameters include a number of sensor modules in the multimode passive detection system.

The system, device and techniques described in this document can implemented as part of an inspection system to inspect volumes of interest for the presence of nuclear threats and other contraband or hazardous items, using ambient or controlled-source illuminating radiation. The described systems, devices and techniques can be used in inspection of large trucks and shipping containers. Other potential embodiments can include, for example, inspection of packages, personnel, or facility access points.

DETAILED DESCRIPTION

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Tomographic imaging can be used to examine volumes of interest (VOI) such as cargo containers, trucks, or other objects, for the presence of certain materials (such as special nuclear materials or contraband materials). Tomographic imaging of such VOI can display regions occupied by materials with signatures related to density and atomic number (Z) to be classified as materials of interest. The described techniques, systems, devices and storage media embodying computer program products for tomographic imaging use naturally occurring, ambient flux of muons and electrons from cosmic rays as the illuminating source. The penetration ability of the muons allows three-dimensional imaging of the VOI. Compared to active sources, tomographic imaging based on naturally occurring sources, with variable incident particle vector momenta, uses different detector electronics and data flow to process detector array signals in order to obtain a tomographic image. A Multi-Mode Passive Detection System (MMPDS) described in this document is an exemplary passive illuminating source-based tomographic imaging system.

In a tomographic imaging system based on naturally occurring cosmic ray charged particles, reconstructing an image relies on identifying the track of individual cosmic ray charged particles entering a charged particle detector array (from above or side of the VOI) and exiting the VOI (below or side of the VOI), having passed through the VOI and having been scattered through some finite scattering angle by dense material within the VOI. This, in turn, is based on processing of raw detection data from each sensor in the array in such a way as to enable identification of incident and exiting tracks of the same particle. The present disclosure includes detailed explanations regarding (a) generic data flow and processing paths for identifying individual particle tracks and (b) an exemplary embodiment of such processing paths.

For tomographic imaging using random shower of incident cosmic ray charged particles, processing based on an illuminating beam with known characteristics is not applicable. For cosmic ray charged particles, particle tracks are reconstructed for each charged particle detected both on entry into and exit from the VOI. To reconstruct the particle track for each charged particle, data from all detectors in the detector array is collated according to the time of detection since the particle speed through the array is very fast compared to all other processes. Each detector at a specified location produces a string of detections in time. The spatially collated data, which correspond to individual time series of detections at each detector location, is converted to temporally collated data, which represent time slices of detections from every detector in the array. The process of taking time series data from each, spatially registered, detector and converting it to data from the entire detector array in a given temporal slice enables tomographic imaging using random cosmic ray-produced particles.

Also, the present disclosure describes exemplary data flow and processes for determining the temporally collated data, identify individual charged particle tracks entering and leaving the detector array, and pairing incident and exiting tracks to measure the effective scattering location and scattering angle. The collection of effective scattering locations and angles is used to reconstruct a tomographic image of the density and the atomic number Z (of the atoms in the VOI) distribution within the VOI. The distribution information is analyzed and characterized to define regions whose properties correspond to materials of interest.

In addition, this document discloses data flows to enable state control, system health monitoring, and data recording processes to operate in parallel with the detection, track and event identification, and volume reconstruction processes outlined above. These processes in combination enable a robust, reliable, and cost-effective system for imaging and detection of materials of interest using natural, ambient cosmic rays.

In an ambient cosmic ray charged particle based Multi-Mode Passive Detection System (MMPDS), an array of drift-tube detectors/sensors can be configured to enable tomographic imaging of a VOI using ambient cosmic rays as the illuminating radiation source. The cosmic ray charged particles, primarily muons and electrons, traverse through the VOI, and measurement of individual particle tracks can be used to reconstruct a three-dimensional distribution of atomic number (Z) and density of materials in the VOI. The drift tubes can also sense/detect gamma rays emitted by the decay of lightly shielded radioactive materials within the VOI, providing a second modality to detect contraband including special nuclear materials.

Because the incoming cosmic ray charged particles are random in nature (rather than a directed, well-characterized beam as in conventional, active-source tomography systems), aspects of the particle detection including accurate location and timing of the particle trajectories are particularly critical to successful implementation of the tomographic imaging system. Techniques, systems, storage media embodying computer program products and devices are described for time synchronizing signals coming from multiple detector arrays to a common system clock in order to record the signals from the multiple detector arrays against a common time base. The described techniques, devices, storage media embodying computer program products and systems can potentially enable tracking and recreation of trajectories of individual cosmic ray-based particles entering the VOI even when the particles are (a) arriving at unknown times and traveling in unknown directions, (b) being scattered by unknown amounts as the particles traverse the VOI, or (c) being absorbed inside the VOI. To track and create the trajectories of individual particles in above described conditions, the described techniques, systems, storage media embodying computer program products can (a) condition each detector array stably to obtain a reliable timing of detection pulses and (b) synchronize the timing across a large array of detectors (e.g., thousands of drift tubes) with very high accuracy (e.g., to within 20 ns). Subsequent electronics can process the digitized data to reconstruct the density distribution in the VOI. Accordingly, the techniques, devices, storage media embodying computer program products and systems described in this document can potentially enable tomography using ambient particle streams from multiple detector arrays in a cost-effective manner.

Electronics for Conditioning Individual Detector Arrays

Figure 1:
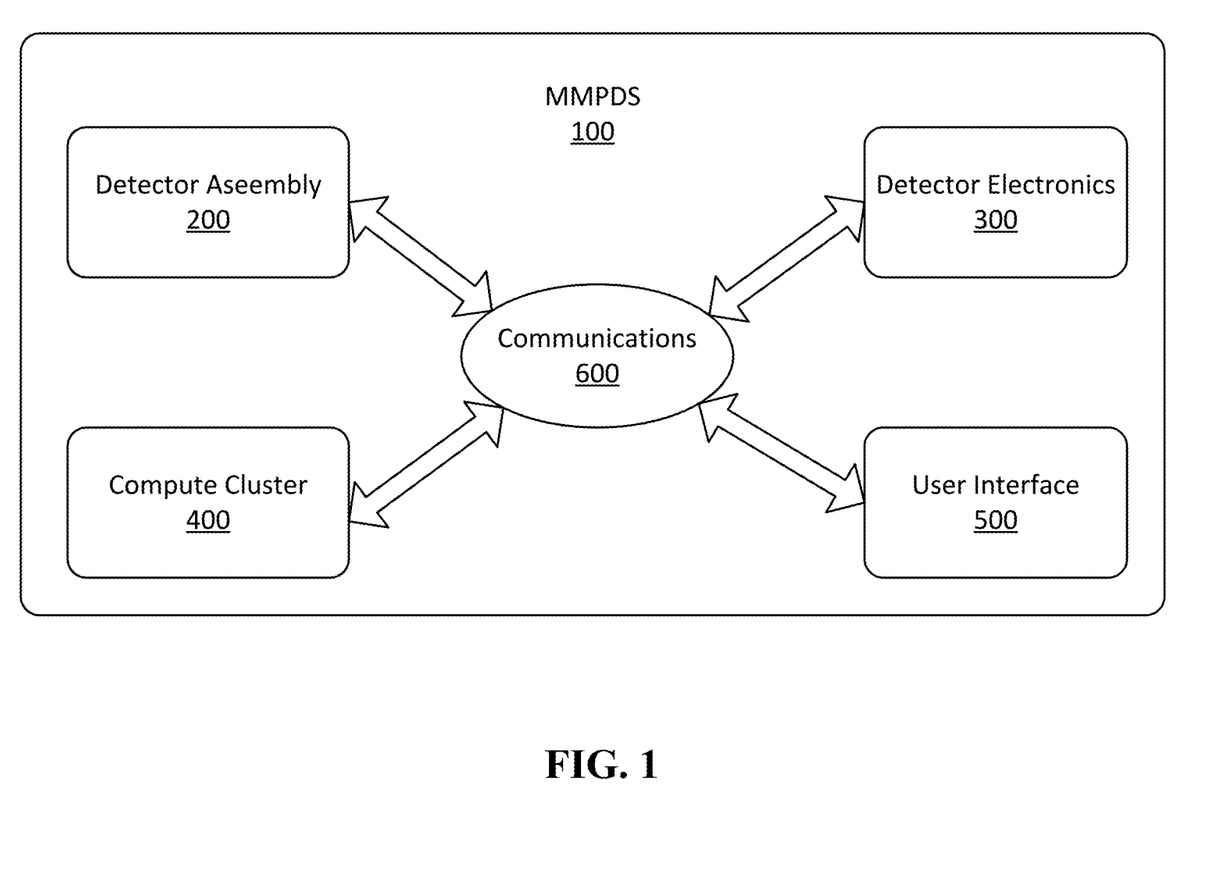
FIG. 1 is a block diagram of an exemplary MMPDS system components and intercomponent communication.

FIG. 1 shows an exemplary MMPDS 100 with four major components. The exemplary MMPDS 100 includes a detector assembly 200, detector electronics or circuitry 300, compute cluster 400, user interface 500, and communications medium 600. The user interface 500 includes one or more graphical user interfaces (GUI) to allow a qualified operator to install, maintain and operate the MMPDS. The detector assembly 200 senses or detects cosmic ray charged particles traversing through a VOI. The detector electronics 300 measures the electrical response of the detector assembly 200 as current pulses and transmits the measured current pulses to the compute cluster 400 to be processed and analyzed. AC main power is provided to the MMPDS system and the provided AC main power can be conditioned as needed to satisfy the MMPDS system components. AC main power is converted into high and low DC voltages for proper operation of various electronic components in the MMPDS system. Low voltages (LV) take standard values and tolerances to operate analog and digital circuitry. High voltage (HV) is used to bias the drift tubes for operation, and is tightly regulated for stable operation. In this document, various aspects of the detector electronics 300 are described.

Figure 2:
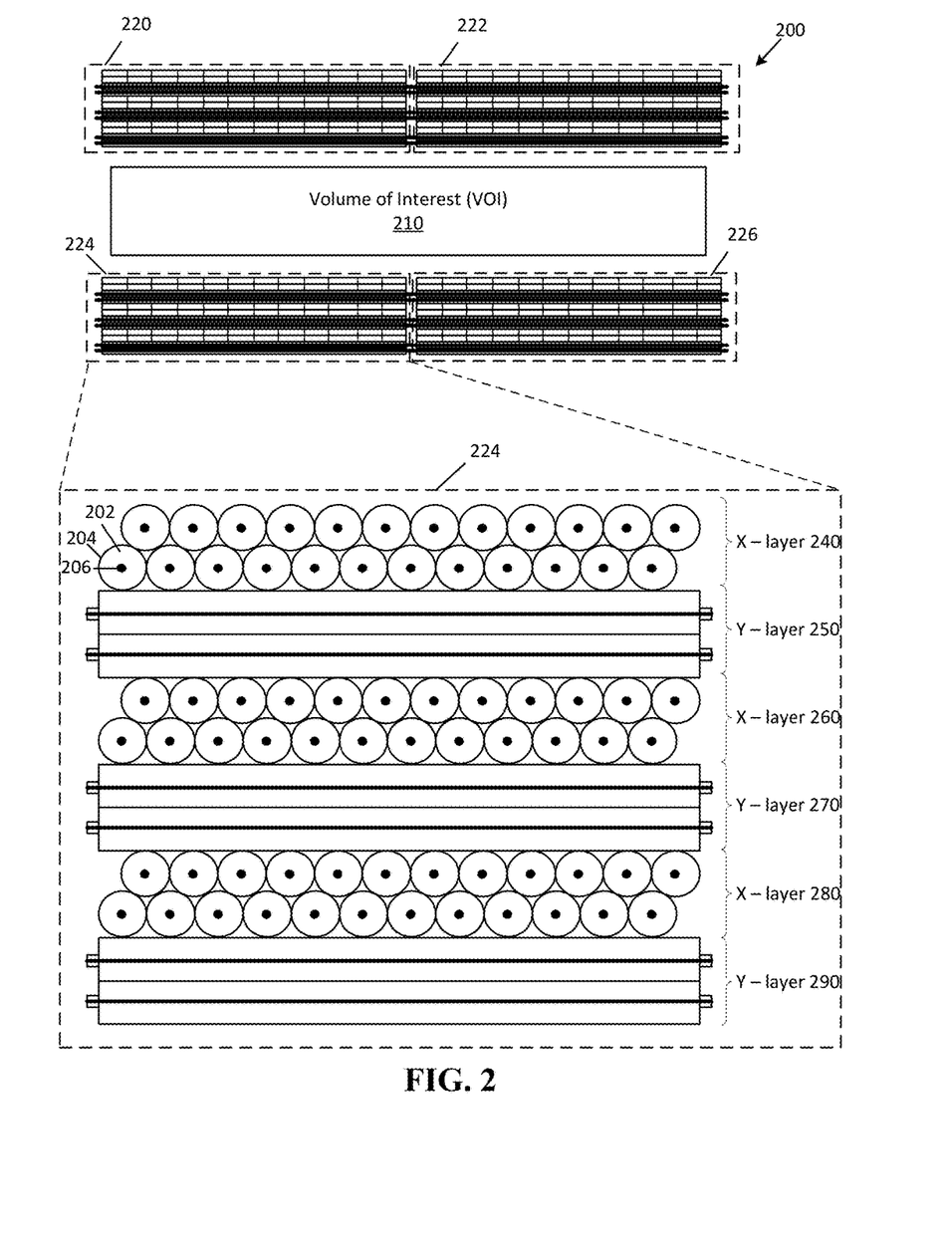
FIG. 2 is a block diagram of an exemplary MMPDS detector assembly.

FIG. 2 is an exemplary detector assembly 200 for detecting cosmic ray charged particles traversing a VOI. As briefly described above, the detector assembly 200 strategically arranged around a VOI 210 (e.g., top and bottom of the VOI) detects and tracks cosmic ray charged particles traversing through the VOI 210. The detector assembly 200 is made up of multiple drift tube arrays designed to allow investigation of the scanned VOI 210. A drift tube 202 is a sealed ionization chamber with a coaxial transmission line filled with a mixture of low-pressure gases. The sealed ionization chamber of a drift tube 202 can be implemented as a hollow cylinder (e.g., 2 inch-diameter aluminum tubes) that is filled with gas and sealed. The aluminum wall of the drift tube acts as a cathode 204. A conductive material, such as a fine gold plated tungsten-rhenium wire element is strung down the long axis of the tube to act as an anode 206. The drift tube 202 produces electrical signals in response to ionization radiation that passes into or through its volume. The drift tube 202 combines three functions into a single device: sensing, timing and gain.

The gas in the drift tube is ionized by incidence of muons that creates electron-ion pairs. For gamma rays, electrons are produced when the gamma ray is incident on the aluminum shell of the drift tube that then ionizes the gas in the drift tube. Since a high-potential difference is maintained between the anode and the cathode (e.g., nominally 2.9 kV), the electrons thus created drift towards the anode and collide with other molecules along the way, with the positively charged ions moving towards the cathode. The movements of electrons in the electric field produce a measureable current on the anode wire. Then the electrons recombine at the wire. The time that elapses between the muon incidence on the drift tube and the measured signal in the anode wire is known as the drift time. The farther the muon trajectory is from the anode, the longer the drift time. The gas itself can include a mixture of helium ($^4$He), ethane, tetrafluoromethane, and argon, chosen to ensure performance and to sustain the large electrical fields inside the drift tube without breakdown.

In order to inspect a large volume, the drift tubes 202 in the detector assembly 200 can be arranged to operate as pairs with each pair representing a signal channel. The total number of signal channels for the detector assembly 200 can vary based on the number of drift tubes 202, for example. The drift tubes 202 can be arranged together into one or more groupings based on the configurations of the drift tubes 202 desired for the detector assembly 200.

On the bottom of FIG. 2 is an exemplary exploded view of a grouping of drift tubes 224 showing a collection of modules arrayed in six layers 240, 250, 260, 270, 280 and 290, alternating between X-facing (e.g., 24-ft) and Y-facing (e.g., 36-ft) modules. While the exploded view is shown for one grouping of drift tubes 224, each of the drift tube groupings can be arranged in substantially similar manner. As described above and shown in FIG. 2, the drift tubes 220, 222, 224 and 226 are arranged to have one grouping of drift tubes (or two groupings of drift tubes arrayed end to end) suspended above the VOI 210 and one grouping of drift tubes (or two grouping of drift tubes arrayed end to end) suspended below the VOI 210 to track cosmic ray charged particles that pass through the VOI 210.

Figure 3:
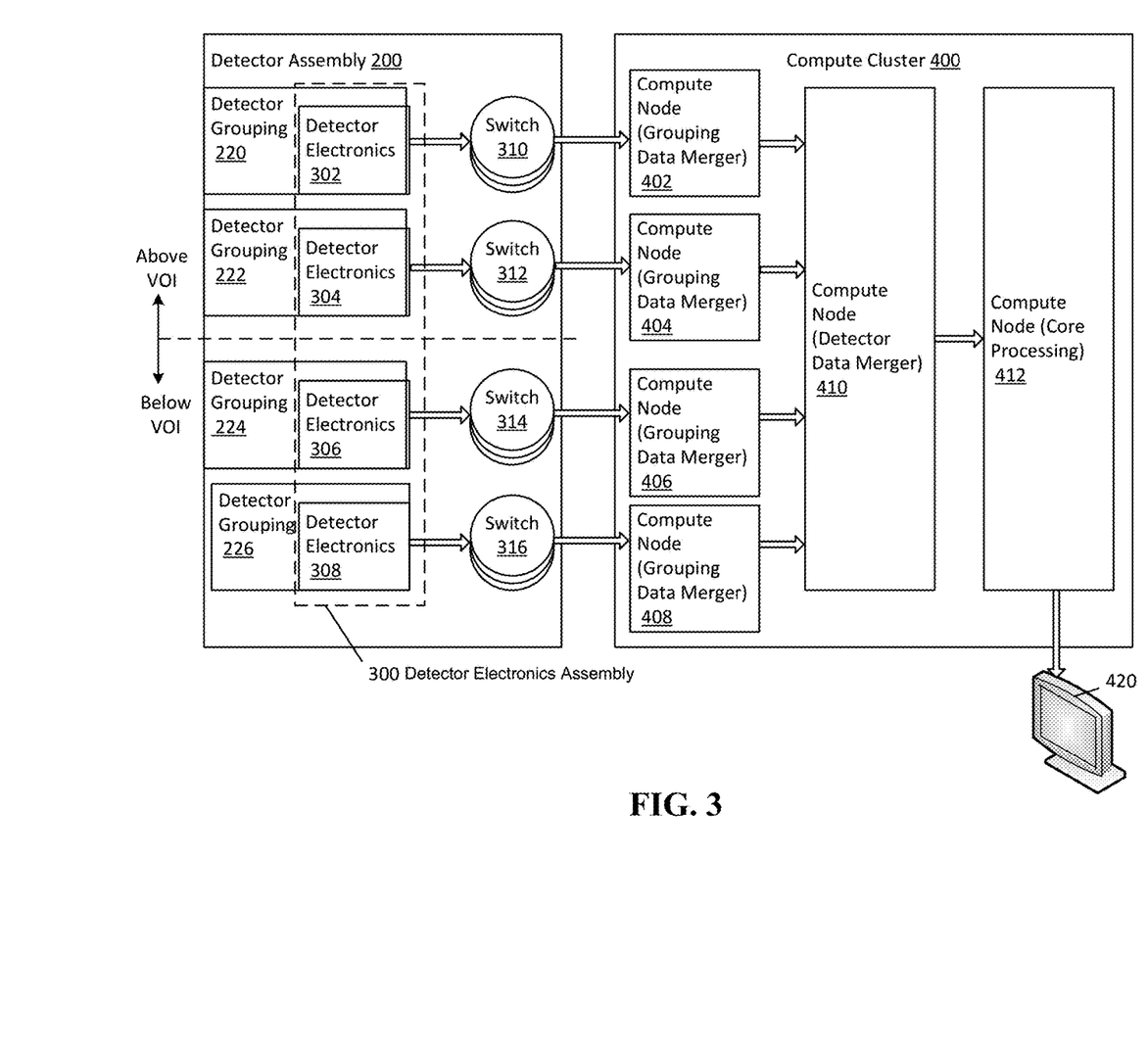
FIG. 3 provides an exemplary data flow of MMPDS.

FIG. 3 is a block diagram showing an exemplary data flow from a grouping of drift tubes to a workstation. Each grouping of drift tubes (e.g., 220, 222, 224 and 226) in the detector assembly 200 is communicatively linked to an individual detector electronics 302, 304, 306 and 308 within the detector electronics assembly 300 to transmit the signals from the sensory arrays in the grouping of drift tubes to a compute cluster 400. A separate detector electronics assembly can be associated with each grouping of drift tubes or one or more detector electronics assembly can communicate with multiple grouping of drift tubes. To transmit the sensor signals from the grouping of drift tubes, one or more switches (e.g., 310, 312, 314 and 316) can be implemented to link with the compute cluster 400. Individual sensor signals from the detector electronics assemblies 302, 304, 306 and 308 can be processed by separate grouping of drift tubes compute nodes 402, 404, 406 and 408 within the compute cluster 400 to merge data for each grouping of drift tubes. A detector compute node 410 within the compute cluster 400 can communicate with the individual grouping of drift tubes compute nodes 402, 404, 406 and 408 to merge all data from all grouping of drift tubes. A core compute node 412 within the compute cluster 400 can communicate with the detector compute node 410 to process the merged detector data. An operator working at a workstation (e.g., 420) can access, view and process the data from the core compute node 412.

The detector electronics (e.g., 302, 304, 306 and 308) of the detector electronics assembly 300 can include conditioning electronics or circuitry for conditioning signals from the groupings of drift tubes. The groupings of drift tubes can interface with a common signal conditioning electronics or circuitry. In some implementations, each grouping of drift tubes can be associated with a separate respective conditioning circuitry or electronics to condition drift tube detector signals that includes high voltage and low voltage (HV/LV) signals received from drift tubes of the corresponding grouping of drift tubes, detect pulses corresponding to passage of a cosmic ray based particle through the corresponding grouping of drift tubes, and convert the detected pulses to a digital signal that are timed according to a system-wide synchronized clock. For implementations integrating the individual detector electronics 302, 304, 306 and 308 into a single detector electronics assembly, a single conditioning circuitry or electronics may be used.

Each drift tube detector module can be operated from the conditioning electronics or circuitry that can include a set of analog and digital electronics to perform various tasks including the following:

(1) Electrically bias the drift tube sensors in their optimal operating range;

(2) Convert signal pulses received from the drift tubes into digital, time-tagged pulses; and (3) Transmit the converted time-tagged pulses to system servers for subsequent processing and analysis.

The conditioning circuitry or electronics can include a high voltage (HV) supply to bias the drift tube and circuitry to process drift tube signals. The HV supply can be designed (e.g., based on a Spellman high-voltage power supply module) to allow high precision monitoring of the output voltage and current. The HV supply can be either electronically or manually controlled and can include digital on/off, high current mode (e.g., in manual operation), local on/off, current and voltage control using digital-to-analog converters (DAC), for example.

Also, the conditioning circuitry or electronics can include a high voltage distribution circuitry that operates as a high voltage splitter that takes a high voltage bias input from the main supply and splits the high voltage bias input into multiple outputs for use in separate detector layers. In calibration process, each drift tube can be operated at its own optimal bias, which can be different from tube to tube. For example, the high voltage distribution circuitry can split the high voltage bias input from the main supply into two layer-compatible outputs. In some implementations, each grouping of drift tubes can have a total of three X-layers, three Y-layers, and three high voltage power supplies. Each power supply can serve one X-layer and one P-layer, for a total of 30 modules in some implementations.

The circuity to process drift tube signals can include electronics and/or circuitry for interfacing the drift tubes with signal processing or measuring electronics or circuitry. For example, the circuitry to process drift tube signals can include interface circuitry including physical or wireless connections (e.g., an interface board) to interface with and obtain the detector signals from the drift tubes directly. The interface circuitry can be physically mounted to the drift tubes and manage the communication medium, such as cabling, between drift tubes and remainder of the electronics of the conditioning electronics or circuitry. The interface circuitry can include passive circuitry to filter out the large DC HV bias used for drift tube operation and passes (e.g., using AC coupling) the resulting, small (LV) current signals can be amplified by an amplifier circuitry. Also, the interface circuitry can provide a bus distribution point for the high voltage bias. The interface circuitry can be in communication with circuitry or electronics to detect and amplify the signals from the interface circuitry. In addition, circuitry to perform signal conversion, such as time to digital converters can be included in the circuitry to process drift tube signals.

The circuitry to detect and amplify the detector signals can include measurement circuitry that measures the current induced in the drift tube detectors. For example, the circuitry to detect and amplify the detector signals can convert and amplify the low-level current signals (e.g., tube pulses) from the drift tubes (e.g., arriving via the interface circuitry) into detectable low voltage differential signals and compare these signals with predetermined, set threshold values. Whenever the detected signal is compared against the threshold (e.g., crosses the threshold), the circuitry to detect and amplify the detector signals can transmit a corresponding digital pulse (e.g., low voltage digital asynchronous pulses) to the time to digital converter to indicate how the signal compares against the threshold values (e.g., higher, lower or met the threshold). The amplified signal from the drift tube signal channel can be sampled and processed to determine whether the sampled signal satisfied one or more predetermined thresholds. The circuitry to detect and amplify the detector signals can also provide onboard circuitry for a Built-In Self-Test (BIST) (not shown), as well as the ability to control threshold levels used to process the sampled signal. The BIST circuitry can verify the entire signal chain (e.g., by simulating a tube pulse on the front end of each amplifier) and use one or more discrete digital-to-analog (D/A) channels for each amplifier channel.

The time to digital converter can convert a signal of relatively infrequent pulses into a digital time representation. The time to digital converter can use a processing unit such as a Field Programmable Gate Array (FPGA) to implement its function. The time to digital converter can output the absolute time of arrival and length of each pulse received. The time to digital converter may not generate pulse amplitude data in some implementations. In such case, a comparator can be used prior to each channel input. The time to digital converter can handle basic functions (e.g., time-to-digital conversion function) as well as buffering, packaging and transmitting the collected drift tube signal data (e.g., hit packets) to the analysis stream, such as an analysis system shown as compute cluster 400. In addition to its time-to-digital function, the FPGA of the time to digital converter can also instantiate an embedded computing platform to manage data transfer, configure the time to digital converter and peripheral hardware, and monitor the conditioning electronics or circuitry for faults. The time to digital converter can include volatile dynamic random access memory units such as Double Data Rate 2 (DDR2) memory, non-volatile flash memory for firmware and program storage, a high-speed Ethernet port, a clock synchronization interface, and multiple connection points to interface with the mezzanine device (computer servers) and external equipment. The time to digital converter can also control the HV supply using a HV control signal to each drift tube channel, ensuring that its bias is set to defined values for optimal operation.

One or more low voltage supplies (LVS) (not shown) can be included in the conditioning electronics or circuitry to provide power to the time to digital converter and the circuitry to detect and amplify the detector signals.

Referring back to FIG. 3, compute cluster 400 can include multiple compute nodes (e.g., computers) for merging individual grouping of drift tubes data (e.g., 402, 404, 406, 408), compute nodes (e.g., computers) for merging all grouping of drift tubes in the detector and compute nodes for processing the merged detector data. The compute nodes in the cluster 400 can operate in combination to contain and execute the MMPDS data processing and analysis software. While CEP 320 includes firmware and a software kernel (e.g., Linux kernel), the system software for MMPDS is located in the compute nodes. The software in the detector electronics assembly can be an embedded application that is responsible for sending measured current pulses to the compute nodes. Each detector electronics assembly (e.g., 200) merges signals from 24 drift tube channels into a single pulse train.

Referring back to FIGS. 1 and 3, the user interface 500 can be implemented as a graphical user interface (GUI). The GUI 500 allows a qualified operator, maintainer and installer to perform various respective functions. The operator functions of the GUI 500 can include at least the following:
  Starting or stopping a scan.
  Seeing the display of a scan in progress.
  Obtaining an automatic clear or alarm output.
  Seeing the display of 3D scans with detected materials and gamma sources.
  Seeing a system status indicator display, providing a clear representation of system health.

The maintainer functions available on the GUI 500 can include allowing the maintainer access to all operator functions as well as to perform system monitoring and general diagnostics.

The installer functions available on the GUI 500 can include allowing the installer to access all operator functions as well as functions for initial installation of the system.

Clock Signal Distribution and Synchronization

In addition, to ensure that the high-accuracy timing requirements are satisfied, MMPDS system 100 includes Accurate Clock Synchronization (ACS) implemented across the system to ensure that the high-accuracy timing requirements are satisfied. In implementing the ACS, clocks are synchronized to within a predetermined time in order to enable identification of particle tracks through the detector array in the detection system 200 by pairing incident and emergent particles correctly. Synchronized clock distribution can be implemented using a clock tree scheme with a network of signal distribution equipment linked to provide circuitry to detect and amplify the detector signals with aligned clock and signal edges meeting the timing precision requirement.

An exemplary clock system for MMPDS 100 can take a single-source (i.e., original or master) clock/synchronization from a master circuitry to detect and amplify the detector signals and distribute the single source clock/synchronization to all circuitry to detect and amplify the detector signals in the MMPDS. Multiple splits of the source signal can be used to deliver a single source to multiple devices in a distribution system of multiple synchronizations devices. For example, multiple splits of the original signal can be used to deliver a single source clock/synchronization to multiple devices in a distribution tree. The original or master clock source is obtained by circuitry in the first level, and each subsequent level can buffer the original or master clock source signal for distribution to the upper and lower grouping of drift tubes. Careful design and choice of matched components, including matched cable lengths, can ensure that each parallel path results in minimum time differences (e.g., no larger than a minimum amount of time acceptable) at each conditioning electronics or circuitry.

MMPDS Data Processing Architecture: Data Processing Modules

Figure 4A:
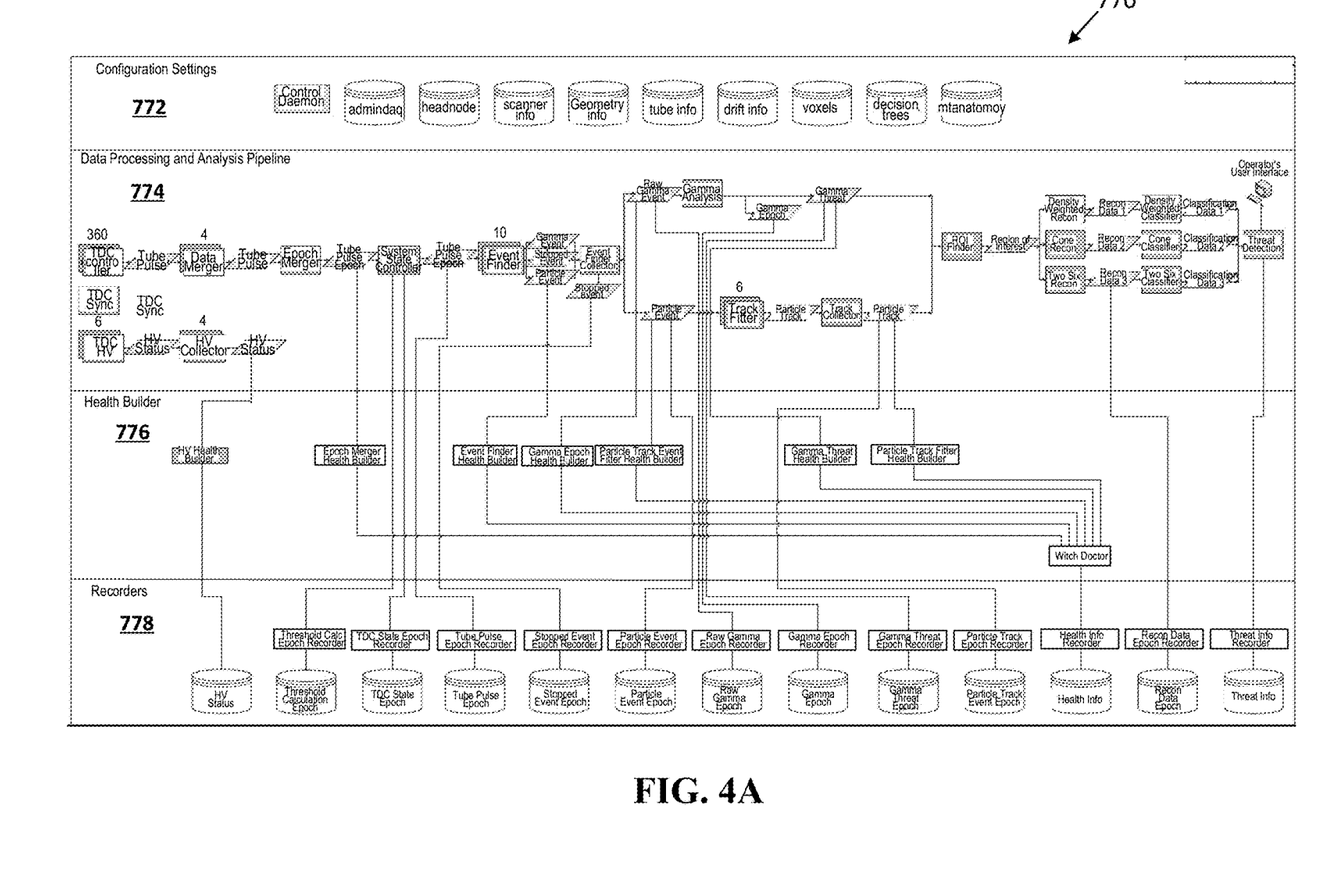
FIG. 4A is a data flow chart showing an exemplary MMPDS Data Processing Architecture.

FIG. 4A is a data flow chart showing an exemplary MMPDS Data Processing Architecture 770. The described MMPDS Data Processing Architecture 770 can include exemplary data flow and processes for determining the temporally collated data, identify individual charged particle tracks entering and leaving the detector array, and pairing incident and exiting tracks to measure the effective scattering location and scattering angle. The collection of effective scattering locations and angles is used to reconstruct a tomographic image of the density and the atomic number Z (of the atoms in the VOI) distribution within the VOI. The distribution information is analyzed and characterized to define potential regions whose properties correspond to materials of interest.

In addition, the described MMPDS Data Processing Architecture 770 includes data flows to enable state control, system health monitoring, and data recording processes to operate in parallel with the detection, track and event identification, and volume reconstruction processes outlined above. These processes in combination enable a robust, reliable, and cost-effective system for imaging and detection of materials of interest using natural, ambient cosmic rays.

At the coarsest scale, the data flow chart in FIG. 4A shows signals organized into four categories or streams. The data category or stream at the top 772 includes system control settings that set operating parameters (e.g., number of sensor modules and groups of sensor modules) in the system, drift tube voltage settings, and so on. The data category or stream at the bottom 778 includes data recorders that record system operating parameters and signals at different stages of processing. The data categories or streams in the two center bands 774 and 776 include functional flow of signals and data. The data category or stream at the upper central band 774 includes a flow of signals in system operation, from raw drift tube output voltages at the extreme left to ultimately processed images and resulting clear/alarm designations at the extreme right. The data category or stream at the lower central band 776 includes various "Health Builders" modules that receive various system signal levels and compare them to predetermined thresholds to determine whether the system is functioning properly. When the system is determined not to be functioning properly, the Health Builders modules can identify components that are malfunctioning based on the comparison of the system signal levels against the predetermined threshold values. The described MMPDS Data Processing Architecture 770 can be organized into control, operation, health monitoring, and recording characteristics, corresponding to the four bands of the flowchart. The discussion that follows focuses on the upper central band, system operation 774.

Detection of charged particles by the drift tube sensors in the sensory array correspond to voltage pulses generated in the drift tube sensors in response to charged particles entering the sensors. As described above, the time to digital convertor (TDC) boards convert these voltage pulses from individual drift tube sensors of individual grouping of drift tubes to digital signals corresponding to the area under the pulse and the time of the pulse, time-stamped with a precision (e.g., of 2 ns) with respect to a common clock signal distributed throughout the sensor array, using the TDC Sync board to ensure that the clock time is identical at each TDC. Since muons travel near the speed of light and traverse the sensor array in a transit time of 15-25 ns, it is important that detections be synchronized accurately.

Figure 4B:
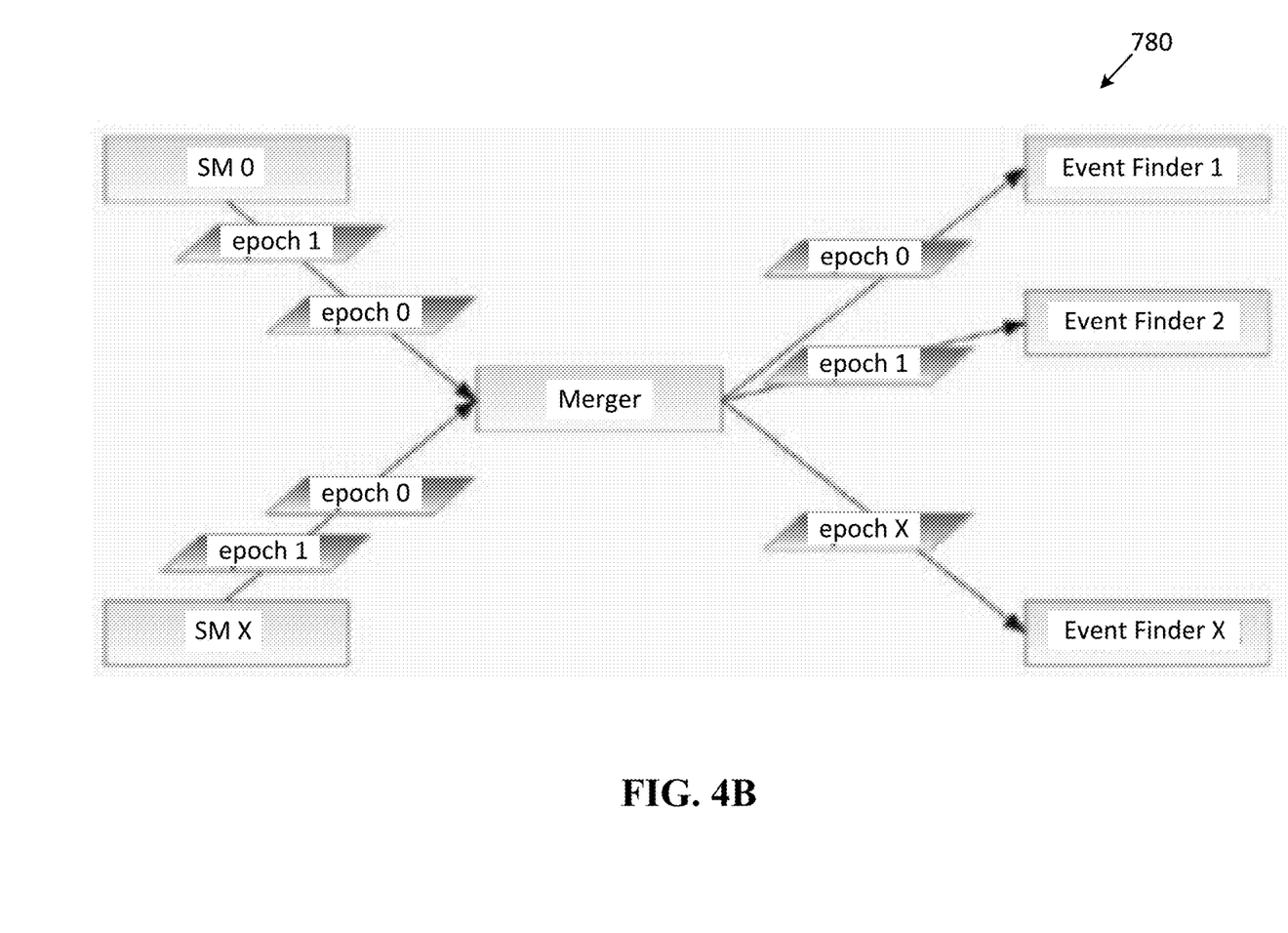
FIG. 4B is a process flow diagram graphically showing an exemplary Data Merger process for converting parallel time streams, already merged into epochs from each sensor module or a group of sensor modules, into sequential epoch records.
Figure 5:
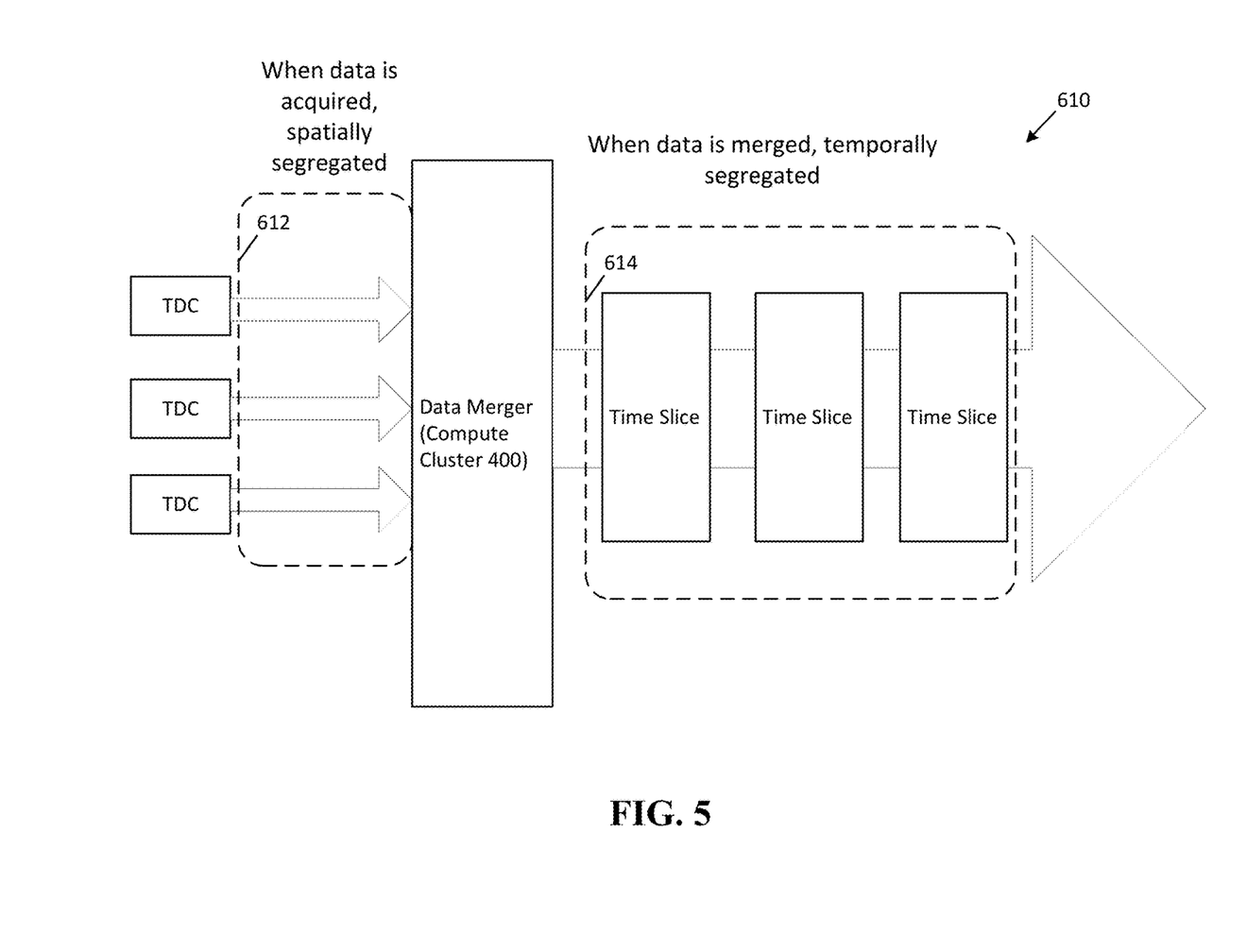
FIG. 5 is a data flow diagram showing an exemplary data merger into time slices.

As described further below with respect to FIG. 5, Data Merger and Epoch Merger processes are two important aspects of the MMPDS Data Processing Architecture 770 that enable tomographic imaging using the random shower of charged particles, such as muons. To perform tomographic imaging using the random shower of charged particles, such as muons, the Data Merger obtains a substantially continuous recording of charged particle detection data in parallel streams from all of the detectors. The Data Merger segregates the obtained data in parallel streams by detector location in the array. The Data Merger combines the spatially segregated data streams from all detectors in the array into a time-synchronous detection stream. The Epoch Merger parses the time-synchronous detection stream into epochs of predetermined durations (e.g., one-second-long epochs) that bin detections from all the detectors in the array within that time span. The epochs are parsed in sliding windows of a predetermined width (e.g., 500 ns). The detection signals from the entire detector array are collated simultaneously or substantially simultaneously in order to parse them into tracks of individual particles. FIG. 4B is a process flow diagram graphically showing an exemplary Data Merger process 780 for converting parallel time streams, already merged into epochs from each grouping of drift tubes, into sequential epoch records. In. FIG. 4B, the merger process changes parallel time streams (in the figure, already merged into epochs from each Super Module (SM0, SMX) into sequential epoch records. The event merger provides each of the merged epochs (0 through X) to the event finders (1 through X) for determination as to when an event (a particle or gamma source) has occurred. An exemplary process for merging spatially separated streams of detector signals into temporally separated time slices is described in a later section of this document.

The System State Controller determines the status of each process in the system. With respect to epochs, the State System Controller determines whether the data are complete or not. Based on the determination of complete or incomplete data, the State System Controller identifies epochs as "good" or "bad", and enables or disables subsequent processing, respectively.

The Data Merger receives data from the detectors, reads the time stamp, and determines whether a corresponding epoch already exists. When determined that a corresponding epoch already exits, the Data Merger appends the data to that epoch. When a corresponding epoch does not exist, the Data Merger creates a new epoch for an active list of epochs. Good epochs are sent on for further processing as outlined below. Bad epochs are deleted from the list. Epochs remain in the Data Merger for a period of time to collect all the data from the array. In some implementations, an epoch that remains for more than a predetermined duration (e.g., 4 seconds) is declared "stale" and is removed from the active list. The time duration for declaring a stale epoch can be set to any particular value of time. Table 1 below illustrates a situation where epoch 296 at time 10000 has gone stale for lack of data from source number 3, while the succeeding epochs are identified as being good.

TABLE 1

An exemplary failure scenario with a stale epoch
System Time = 100005
Stale Time = 4 seconds

| Epoch Number | Time | DAQ Source 1 | DAQ Source 2 | DAQ Source 3 | DAQ Source 4 |
| --- | --- | --- | --- | --- | --- |
| 300 | 10004 | Good | Good | Good | Good |
| 299 | 10003 | Good | Good | Good | Good |
| 298 | 10002 | Good | Good | Good | Good |
| 297 | 10001 | Good | Good | Good | Good |
| 296 | 10000 | Bad | Bad | Bad (lack of data) | Bad |

Good epochs are sent to the Event Finder process to identify usable particle tracks. The MMPDS can set criteria for define different types of events including: (1) a muon transiting the detector, (2) a muon stopped (absorbed) within the volume of interest (VOI), and (3) a gamma ray emitted by radioactive material within the VOI.

Once tracks are collected, an ROI Finder process evaluates regions within the VOI likely to contain potential scattering bodies and/or gamma ray sources. Image reconstruction algorithms use the tracks, constrained by the ROI Finder, to reconstruct an image of the density of material within the VOI. Finally, a material of interest detection algorithm evaluates the image and ROI Finder data to declare the presence or absence of a material of interest, automatically. The image is also available to a human operator for interpretation.

Described in this document are the overall MMPDS data flow architecture and the importance of collating all events recorded by the entire detector array within a narrow time window, in order to extract the likely particle trajectories needed to reconstruct the atomic number, density, and possible radioactivity of materials distributed within the VOI.

The described data processing architecture and individual processes within that architecture can be modified to include various refinements. Exemplary refinements can include use of different criteria for accepting or rejecting a given particle detection as part of a valid track; substitution of different algorithms to determine the most likely effective location of a scattering event, and its angle; the substitution of different image reconstruction algorithms at the reconstruction step; and use of different algorithms to identify regions of interest within the VOI. In some implementations, multiple algorithms may be used in parallel to accomplish any task in the data flow, and their multiple outputs may be combined to improve the likelihood of obtaining a more accurate image or material of interest assessment. Described below are only a few illustrative embodiments and examples of data categories or streams of the MMPDS data processing architecture including Data Processing Modules, Health Monitoring Modules and Data Recording Modules. Each of the exemplary data categories or streams is further described to include respective processing modules.

MMPDS Data Processing Architecture: Data Processing Modules

Data is captured from the TDC electronics in a continuous stream. The initial acquisition is performed by hundreds of discrete collection points. In some implementations, over 360 discrete collection points are used to perform the initial acquisition. Therefore, large amounts of data are concurrently being sent in parallel streams to multiple data mergers. At that point, the data are spatially segregated.

The data are geometrically split into multiple streams (different streams represent different detector modules). To perform event finding and track fitting, data from all geometric locations of the detector are available simultaneously. To accomplish this, all TDC data are collated, time-stamped, time-sorted, and divided into discrete time increments as shown in FIG. 5. FIG. 5 is a block diagram showing an exemplary data flow 610 for merging drift tube detector data from individual TDC into time slices. Acquired drift tube detector data are spatially segregated (see 612) while the merged data is temporally segregated (see 614). Thus, instead of analyzing a segment of data collected from a section of the MMPDS, the analysis is performed on a detector-wide time-slice of data. The time-slices of data are processed to find and track both muons and gamma rays. This information is processed and combined to reconstruct the image of the scanned volume and identify any regions potentially containing a material of interest. The results are communicated to the operator through a user interface (e.g., user interface 500). Also, the system is continually monitored for satisfactory performance with data being recorded and system performance being logged.

Figure 6:
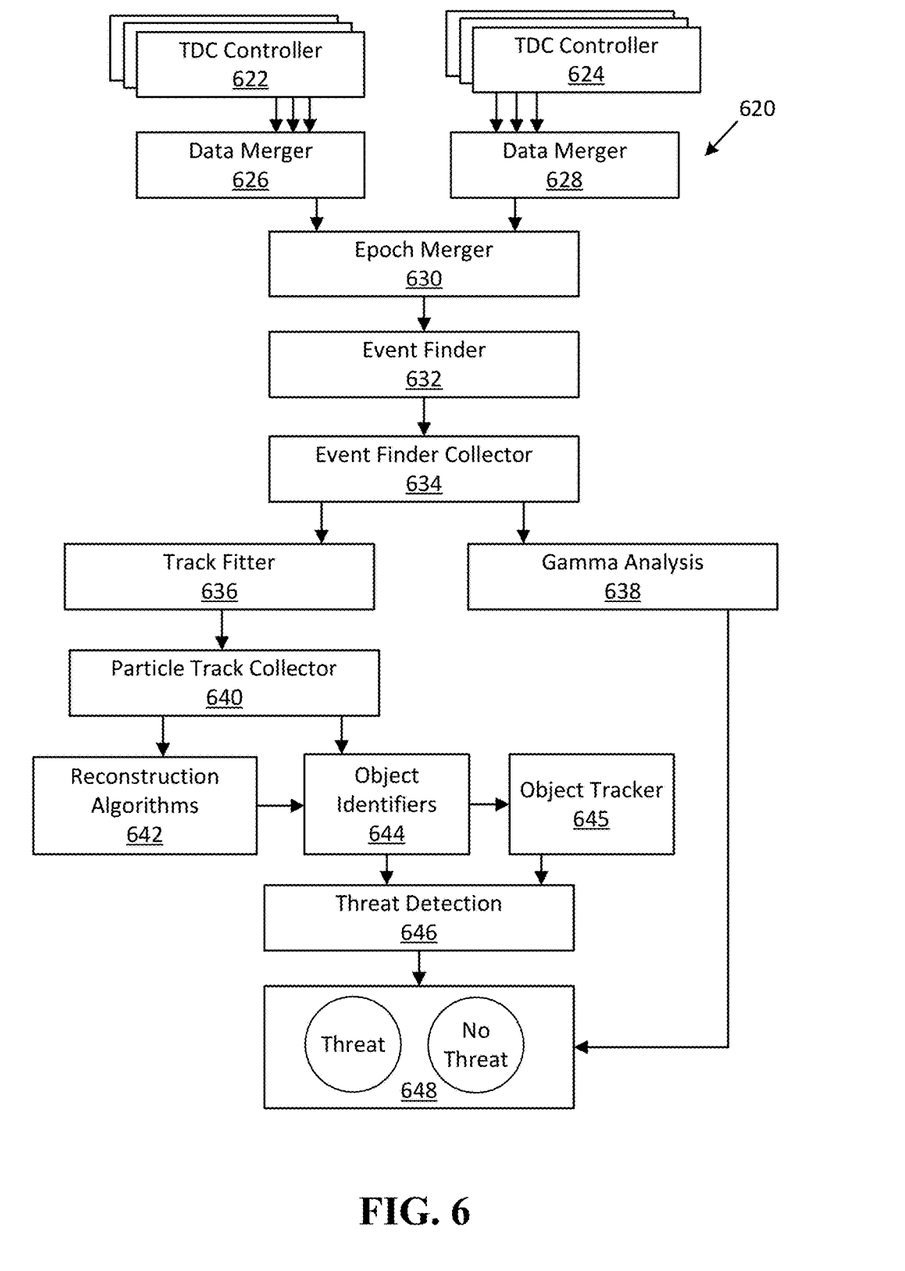
FIG. 6 is a process flow diagram showing an exemplary process for data process and analysis.

FIG. 6 is a data flow diagram showing an exemplary process module 620 for data processing and analysis. The data processing and analysis modules 620 includes TDC controller process modules 622 and 624 to capture time-stamp tube pulses from the TDC circuitry in a continuous stream. Each TDC is verified to be synchronized, for example at a one pulse per second (PPS) rate, ±20 ns of the mean synchronization. The TDC controller process module can operate in a continuous data collection fashion. The samples collected for each of the tubes connected to the TDC can be collected over a one second interval. At each one second boundary, identified as an epoch, the TDC controller process module can output the full report of hits to the Data Merger 626 and 628. The TDC controller process modules 622 and 624 can interface to the TDC over a TCP/IP interface. Each TDC can be assigned a unique TCP/IP address. The TDC controller process modules 622 and 624 can perform auto thresholding. Auto thresholding can make adjustments for tubes that have statistically high or statistically low hits by appropriately changing threshold level at which a tube pulse hit is detected. The TDC can send a minimum of tube hit rates, high voltage status, and synch status for performance monitoring purposes.

A separate data merger processing module (626, 628) is assigned to each grouping of drift tubes to collect tube pulse hit signals received from the TDC controller and merge the collected tube pulse hit signals together to create discrete time increments (epochs) of hits. The MMPDS system can provide a single Data Merger for each sensor module or a group of sensor modules. Each Data Merger collates, sorts by time, and divides the data into discrete epochs within a single epoch window.

Epoch merger module 630 merges the hit epochs from the Data Mergers to create detector wide hit epochs. The MMPDS system can provide a single Epoch Merger. The Epoch Merger can collate the epochs from the Data Mergers to create detector-wide epochs.

The tube pulse event finder module 632 determines when an event (a particle or gamma source) has occurred. The tube pulse event finder module can identify three types of events in sliding windows of time: Particle Events (hits indicated a particle (muon or electron) passed through the detector), Stopped Particle Events (hits indicating a particle stopped within the detector), and Gamma Events (hits indicating a gamma source). The sliding window can be 500 ns, for example. The tube pulse event finder 632 can distinguish between the three types of events based on multiplicity of hits.

The event finder collector module 634 collects the charged particle events identified by the event finder 632.

Track fitter module 636 determines the trajectories of the charged particles, for example muon trajectories. The track fitter 636 uses the particle epochs provided by the Event Finder 632 and, using a track fitting algorithm, determine the muon trajectories. The Track Fitter 636 can develop tracks for the top sensor module or a group of sensor modules as well as the bottom sensor module or a group of sensor modules.

The particle track collector 640 receives the particle trajectory data as calculated by the track filter module 636.

The reconstruction algorithms process module 642 creates a three-dimensional density map of the scan volume. The reconstruction algorithms process module 642 can contain one or more processing algorithms to ensure that the required probability of detection or performance requirements is met. Multiple reconstruction algorithms process modules 642 can be implemented to perform different reconstruction algorithms in parallel. The object identifier module(s) 644 use the information obtained from the reconstruction algorithms process module 642 and particle track collector 640 to identify the object according to particular algorithm(s). The information obtained from the object identifier module 644 is provided to the object tracker module 645. The threat detection module 646 uses the information obtained from the object identifier module 644 and object tracker module 645 to identify and detect the particular threat. The output of the threat detection module 646 and the information obtained from the gamma analysis module 638 can be used at 648 to identify whether or not a threat exists.

MMPDS Data Processing Architecture: Health Monitoring Modules

The MMPDS system 100 can include a Health Monitoring capability to enable maintenance to ascertain the status of the system. Health monitoring can include measuring and tracking one or more health metrics to determine the status of the system. The Health Monitoring ensures that the data is safely received and delivered for processing. One or more of the recorded health metrics can be compared to set parameters and displayed on the Health Monitoring Display. Information received from the MMPDS that has either higher or lower rates than the specified range represent out of range values. The out of range values can be presented using a color (e.g., Red) or textual indicators such as "high", "low". Additional indicators can be used such as icons with a down arrow representing values lower than the specified range and an up arrow representing values higher than the specified range. Also, the received values can be displayed next to the specified range to indicate the out of range status. Other indicators, visual, audio and others that provide the necessary information can be used. Using the color indicator example, the values within optimal range can be displayed in green. Blue color can be used to indicate that no data is being received. Yellow color can represent values that do not apply to the health of the system.

Based on the information obtained by the Health Monitoring Processing modules, parameters can be determined for identifying a number of good or healthy tubes, a number of failed tubes, hits per epoch, tracks per epoch, and mean scattering angle, etc.

Figure 7:
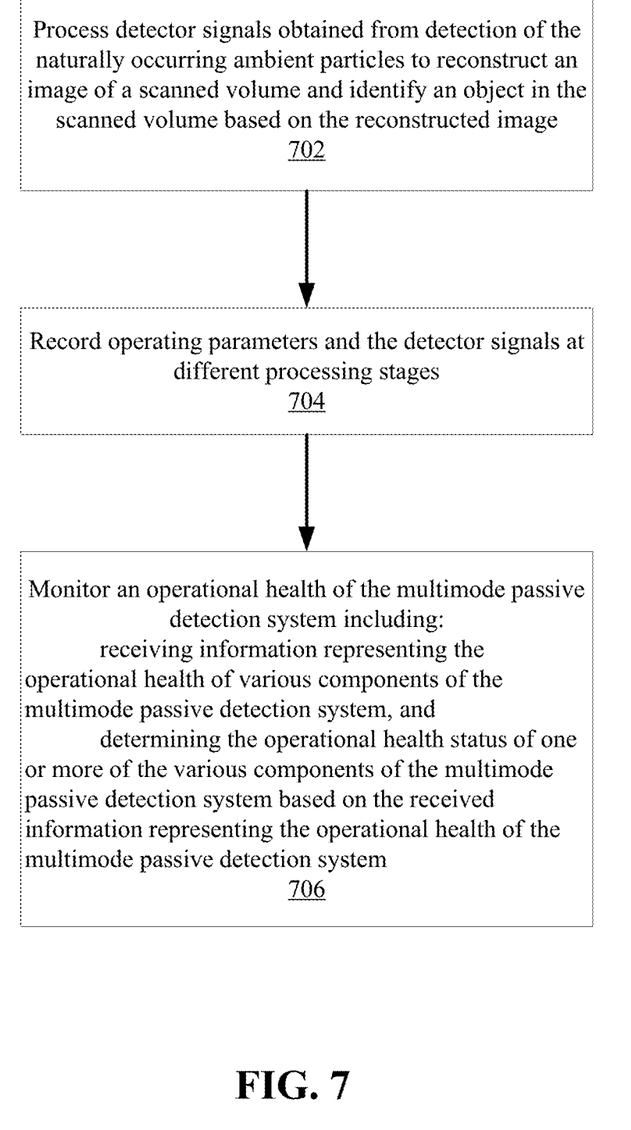
FIG. 7 illustrates a set of exemplary operations that can be carried out to operate a multimode passive detection system.

FIG. 7 illustrates a set of exemplary operations that can be carried out to operate a multimode passive detection system that operates based on detection of naturally occurring ambient particles. At 702, detector signals obtained from detection of the naturally occurring ambient particles are processed to reconstruct an image of a scanned volume and identify an object in the scanned volume based on the reconstructed image. At 704, operating parameters and the detector signals are recorded at different processing stages. At 706, an operational health of the multimode passive detection system is monitored that includes receiving information representing the operational health of various components of the multimode passive detection system, and determining the operational health status of one or more of the various components of the multimode passive detection system based on the received information representing the operational health of the multimode passive detection system.

While this document contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this document.

What is claimed is:

1. A multimode passive detection system responsive to naturally occurring ambient charged particles, comprising:
a processor and a memory having instructions stored thereupon, wherein the instructions upon execution by the processor configures the multimode passive detection system to:
set system control settings including operating parameters for the multimode passive detection system;
process detector signals received from charged particle detectors to reconstruct an image of a scanned volume and identify a region of interest in the scanned volume based on the reconstructed image, wherein processing of the detector signal includes:
obtaining, from the charged particle detectors, detector data representing an electrical response to one or more charged particles entering respective charged particle detectors as spatially separated data streams,
merging the spatially segregated data streams obtained from the charged particle detectors into a time-synchronous detection stream, and
identifying the region of interest in the scanned volume based at least in-part on particle tracks associated with the charged particles entering the charged particle detectors;
record the set operating parameters and the detector signals at different data processing stages;
receive information representing operational health of various components of the multimode passive detection system; and
determine an operational health status of one or more of the various components of the multimode passive detection system, wherein the determination of the operational health status is based on a comparison of the received information representing operational health of various components of the multimode passive detection system against a range of predetermined parameters.

2. The multimode passive detection system of claim 1, wherein the instructions upon execution by the processor configures the multimode passive detection system to process detector signals, record the operating parameters and the detector signals, and receive information representing operational health substantially in parallel.

3. The multimode passive detection system of claim 1, wherein the instructions upon execution by the processor configures the multimode passive detection system to process detector signals to determine whether the identified region contains a material of interest.

4. The multimode passive detection system of claim 1, wherein the instructions upon execution by the processor configures the multimode passive detection system to process detector signals by:
parsing the time-synchronous detection stream into epochs of a predetermined time duration.

5. The multimode passive detection system of claim 4, wherein the instructions upon execution by the processor configures the multimode passive detection system to collate the charged particle detector data from the charged particle detectors substantially simultaneously to obtain detector data, merge the spatially segregated data streams, and parse the time-synchronous detection stream.

6. The multimode passive detection system of claim 4, wherein instructions upon execution by the processor configures the multimode passive detection system to:
identify the particle tracks associated with the charged particles entering the charged particle detectors; and
collect the identified particle tracks.

7. The multimode passive detection system of claim 6, wherein the instructions upon execution by the processor configures the multimode passive detection system to process detector signals by:
identifying an object of interest in the scanned volume based on the collected particle tracks; and
determining whether the identified object contains a material of interest.

8. The multimode passive detection system of claim 1, wherein the operating parameters include a number of sensor modules in the multimode passive detection system.

9. The multimode passive detection system of claim 1, wherein the instructions upon execution by the processor configures the multimode passive detection system to:
display on a monitor the operational health status of one or more of the various components, wherein
the operational health status of one or more of the various components is configured to indicate whether the operational health status is within the range of the predetermined parameters, and
the operational health status of one or more of the various components is configured to whether the operational health status is out of the range of the predetermined parameters.

10. A method of operating a multimode passive detection system that operates based on detection of naturally occurring ambient charged particles, comprising:
setting system control settings including operating parameters for the multimode passive detection system;
processing detector signals obtained from detection of the naturally occurring ambient particles to reconstruct an image of a scanned volume and identify a region of interest in the scanned volume based on the reconstructed image, wherein the processing of detector signals includes:
obtaining from the charged particle detectors detector data representing an electrical response to one or more charged particles entering respective charged particle detectors as spatially separated data streams,
merging the spatially segregated data streams obtained from the charged particle detectors into a time-synchronous detection stream, and
identifying the region of interest in the scanned volume based at least in-part on particle tracks associated with the charged particles entering the charged particle detectors;
recording the set operating parameters for the multimode passive detection system and the detector signals at different data processing stages; and
monitoring an operational health of the multimode passive detection system including:
receiving information representing the operational health of various components of the multimode passive detection system, and
determining an operational health status of one or more of the various components of the multimode passive detection system, wherein the determining of the operational health status is based on a comparison of the received information representing the operational health of the various components of the multimode passive detection system against a range of predetermined parameters.

11. The method of claim 10, wherein the processing, the recording and the monitoring operations are performed substantially in parallel.

12. The method of claim 10, wherein the processing of detector signals includes determining whether the identified region of interest contains a material of interest.

13. The method of claim 10, wherein the processing of detector signals includes:
parsing the time-synchronous detection stream into epochs of a predetermined time duration.

14. The method of claim 13, wherein the processing of detector signals includes collating the charged particle detector data from the charged particle detectors substantially simultaneously.

15. The method of claim 13, wherein the processing of detector signals includes:
identifying the particle tracks associated with the charged particles entering the charged particle detectors based on the epochs; and
collecting the identified particle tracks.

16. The method of claim 15, wherein the processing of detector signals includes:
identifying the region of interest in the scanned volume based on the collected particle tracks; and
determining whether the identified region of interest contain a material of interest.

17. The method of claim 10, wherein the operating parameters include a number of sensor modules in the multimode passive detection system.

18. The method of claim 10, wherein the naturally occurring ambient particles include a muon or an electron from cosmic rays.

19. The method of claim 10, wherein the determining of the operational health status comprises:
displaying, using a monitor, the operational health status of one or more of the various components, wherein
the operational health status of one or more of the various components indicates whether the operational health status is within the range of the predetermined parameters, and
the operational health status of one or more of the various components indicates whether the operational health status is out of the range of the predetermined parameters.

* * * * *

UNITED STATES PATENT AND TRADEMARK OFFICE
CERTIFICATE OF CORRECTION

PATENT NO. : 10,067,260 B2
APPLICATION NO. : 15/019856
DATED : September 4, 2018
INVENTOR(S) : Shawn McKenney et al.

Page 1 of 1

It is certified that error appears in the above-identified patent and that said Letters Patent is hereby corrected as shown below:

In the Specification

In Column 8, Line 27, delete "P-layer," and insert --Y-layer,--, therefor.

Signed and Sealed this
Third Day of December, 2019

Andrei Iancu
*Director of the United States Patent and Trademark Office*